(12) United States Patent
Mann

(10) Patent No.: US 11,920,870 B1
(45) Date of Patent: Mar. 5, 2024

(54) THERMAL ENERGY STORAGE SYSTEM

(71) Applicant: D'Arcy Mann, Saskatoon (CA)

(72) Inventor: D'Arcy Mann, Saskatoon (CA)

( * ) Notice: Subject to any disclaimer, the term of this patent is extended or adjusted under 35 U.S.C. 154(b) by 0 days.

(21) Appl. No.: 18/473,475

(22) Filed: Sep. 25, 2023

(51) Int. Cl.
*F28D 20/00* (2006.01)

(52) U.S. Cl.
CPC ..... *F28D 20/0034* (2013.01); *F28D 20/0056* (2013.01); *F28D 2020/0082* (2013.01); *Y02E 60/14* (2013.01)

(58) Field of Classification Search
CPC ............ F28D 20/0034; F28D 20/0056; F28D 2020/0082; Y02E 60/14; F24D 2220/10; F24H 7/0441
See application file for complete search history.

(56) References Cited

U.S. PATENT DOCUMENTS

2018/0195741 A1* 7/2018 Field ................... F24D 11/003

FOREIGN PATENT DOCUMENTS

JP 2004271003 A * 9/2004

* cited by examiner

*Primary Examiner* — Eric S Ruppert
(74) *Attorney, Agent, or Firm* — Kyle R Satterthwaite; Ryan W Dupuis; Ade & Company Inc.

(57) ABSTRACT

A thermal energy storage system (TESS), effectively a thermal energy battery, is characterized by combination of wet and dry tanks and a circuitously routing of a liquid heat exchange medium from the wet tank through the dry tank such that electrically or fluidically sourced thermal energy can be stored in a dry heat-storage medium, and later released on demand. An optional phase change material (PCM) may be held in a third tank that is likewise circuitously served with the liquid heat exchange medium to enable more sudden and rapid release of energy when the PCM drops to its phase change temperature, for more instantaneous response to heat demand. The TESS may serve space heating and/or hot water demands of a residential home or other small building. The heat exchange medium may be warmed through operation of a heat pump acting in an air conditioning capacity to cool an indoor space.

20 Claims, 6 Drawing Sheets

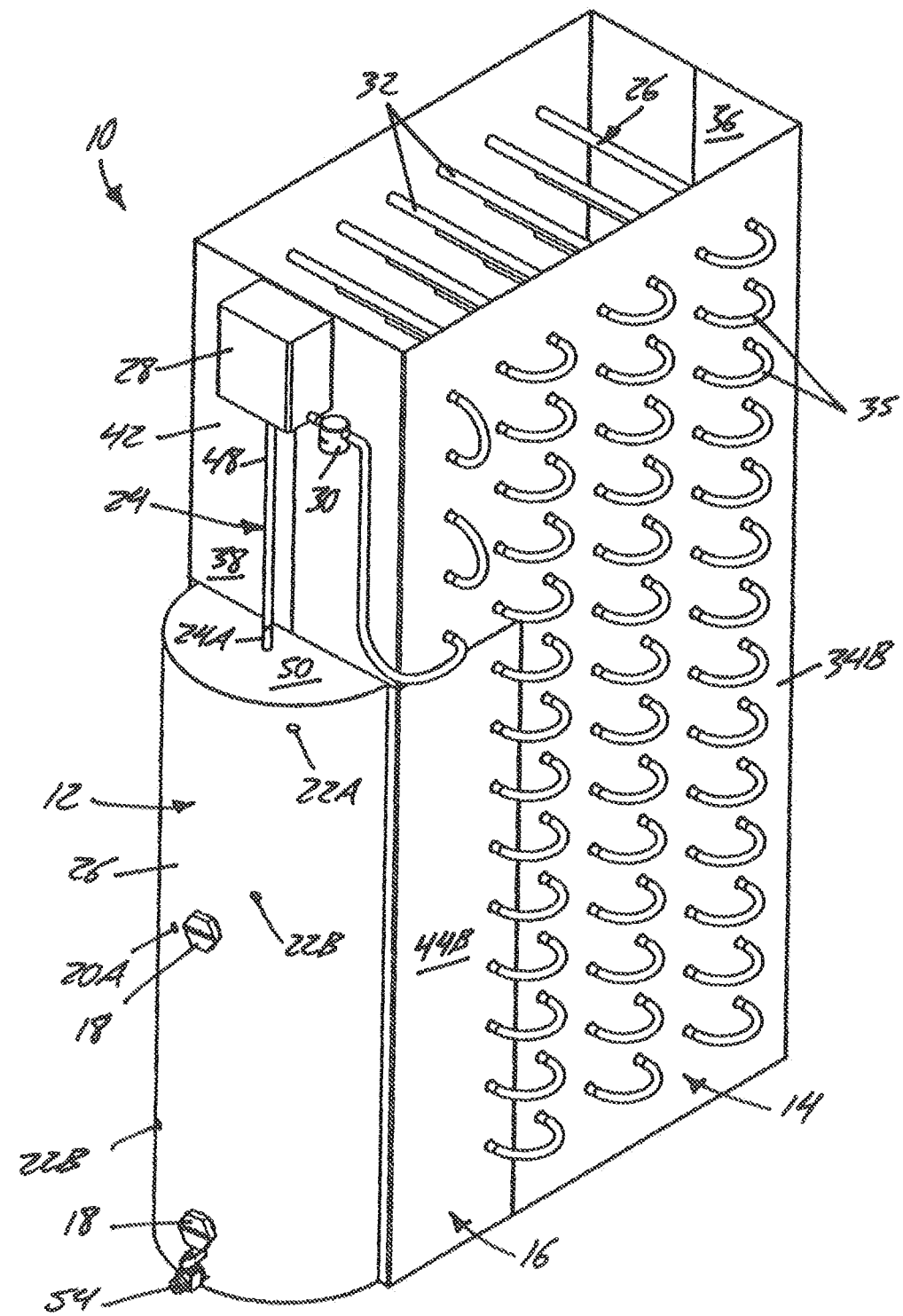

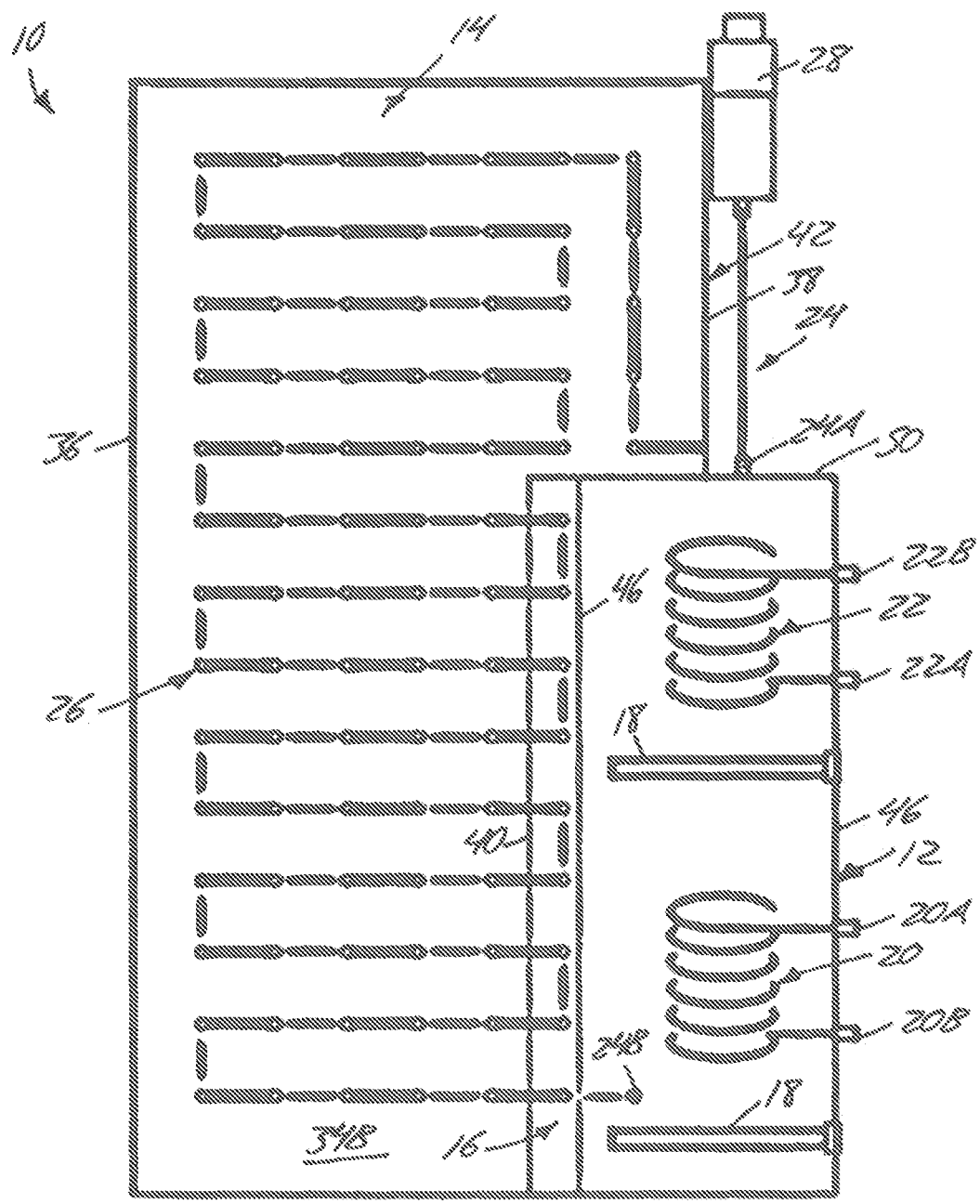

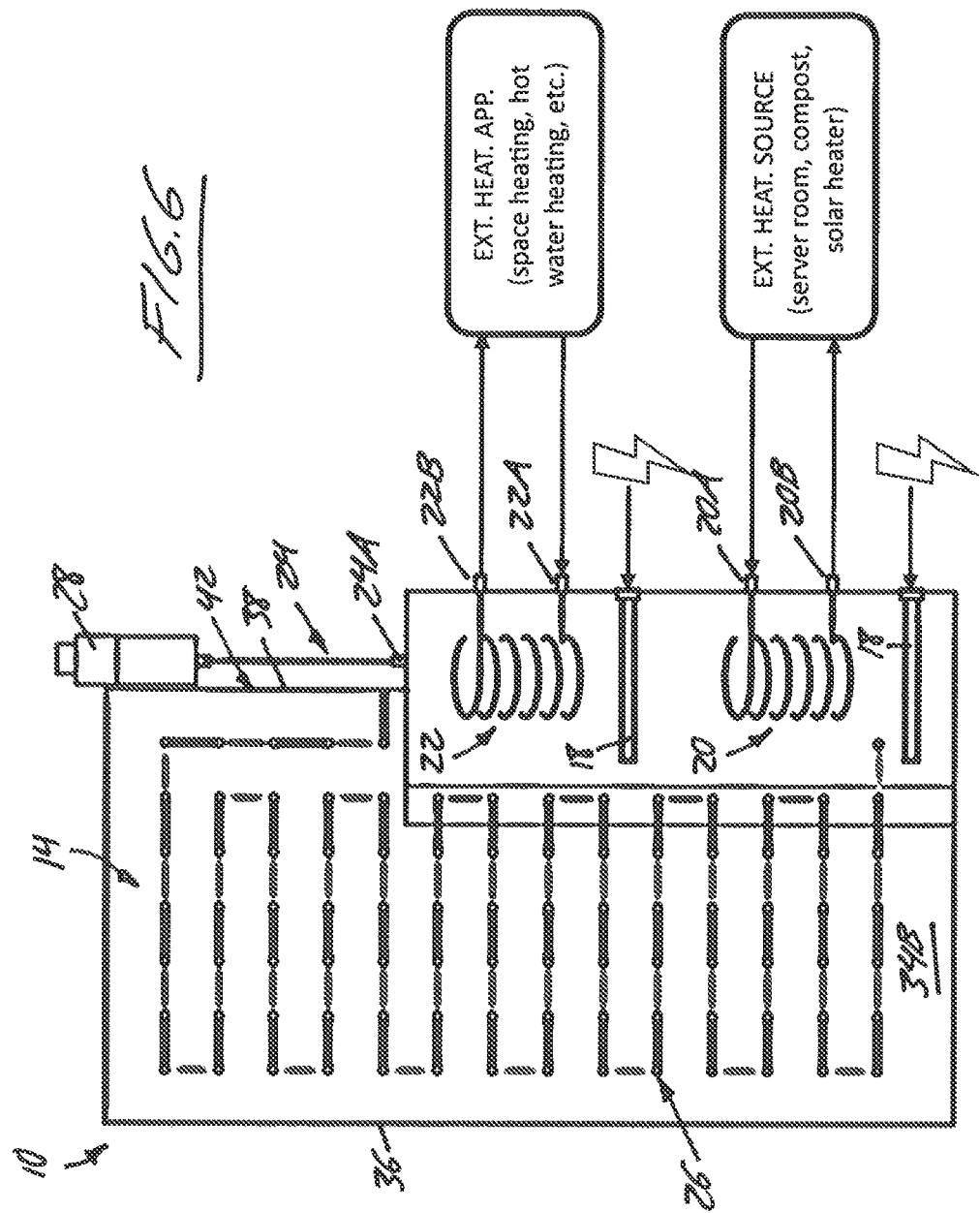

THERMAL ENERGY STORAGE SYSTEM

FIELD OF THE INVENTION

The present invention relates generally to energy storage, and more particularly to thermal energy storage for effective use in the context of fulfilling space heating and/or hot water supply demands of residential households and other buildings.

BACKGROUND

The idea of storing thermal energy for future use is not itself a new concept, and is known, for example, to balance varying energy demands, whether that be short term load variation between daytime and nighttime hours, or longer outlook such as the capture of summer heat to fulfill intensive space heating needs during the winter season. As a recent example, Polar Night Energy out of Finland has garnered some media attention for a thermal energy storage solution in which electrical energy harnessed from solar and wind energy is transformed into heat energy, which is then stored in a volume of sand contained in a storage silo, which has been referred to by some as a "sand battery". Published U.S. Patent Application 2022/0146205, Polar Night Energy has proposed using the stored heat from such a sand battery for domestic heating, domestic hot water supply, or industrial heating applications.

Polar Night's testing and commercial activities in Finland appear to focus on community-wide implementation, where the sand battery connects to a district heating system that delivers heated water throughout a community. That said, there remains a need for alternative solutions that can be implemented at the household level, for example to serve communities that are not served by a district heating networks.

SUMMARY OF THE INVENTION

According one first aspect of the invention, there is provided a thermal energy storage system comprising:
  combined in a singular appliance:
    a wet tank for holding a liquid heat transfer medium therein;
    a dry tank for holding a dry storage medium therein;
    one or more circuitous heat exchange conduits each having an inlet of fluidically communicative relationship with an interior of the wet tank, and an outlet of fluidically communicative relation to the wet tank at a point of discrete relation to said inlet, and at least a subset of the one or more circuitous heat exchange conduits passes circuitously through an interior of the dry tank in fluidly isolated relation to the dry storage medium held therein;
    one or more pumps in operably installed relationship with said one or more circuitous conduits to circulate the liquid heat transfer medium therethrough in a manner sourced from the wet tank at the inlet of each circuitous conduit, conveyed onwardly and circuitously through the dry tank via said at least a subset of the circuitous one or more circuitous heat exchange conduits, and returned to the wet tank via the outlet of each circuitous conduit; and
    one or more heating components installed in operable relationship to the wet tank to enable warming of the liquid heat transfer medium held therein;
    an output conduit installed the wet tank for routing of a service fluid through the interior of the tank in fluidly isolated relation to the liquid heat transfer medium held therein for heating of said service fluid by the liquid heat transfer medium;
  whereby operation of the one or more pumps to circulate the liquid heat transfer medium, once warmed by one or more heat inputs, through the dry tank is operable to store heat energy in the dry storage medium.

According to another aspect of the invention, there is provided a thermal energy storage system comprising:
  a wet tank for holding a liquid heat transfer medium therein;
  a dry tank for holding a dry storage medium therein;
  one or more circuitous heat exchange conduits each having an inlet of fluidically communicative relationship with an interior of the wet tank, and an outlet of fluidically communicative relation to the wet tank at a point of discrete relation to said inlet, and at least a subset of the one or more circuitous heat exchange conduits passes circuitously through an interior of the dry tank in fluidly isolated relation to the dry storage medium held therein;
  one or more pumps in operably installed relationship with said one or more circuitous conduits to circulate the liquid heat transfer medium therethrough in a manner sourced from the wet tank at the inlet of each circuitous conduit, conveyed onwardly and circuitously through the dry tank via said at least a subset of the circuitous one or more circuitous heat exchange conduits, and returned to the wet tank via the outlet of each circuitous conduit; and
  an output conduit installed the wet tank for routing of a service fluid through the interior of the tank in fluidly isolated relation to the liquid heat transfer medium held therein for heating of said service fluid by the liquid heat transfer medium;
  at least one heating element installed in the wet tank and operable to warm the liquid heat transfer medium held therein; and
  at least one input conduit installed the wet tank for routing of an externally heated fluid through the interior of the tank in fluidly isolated relation to the liquid heat transfer medium held therein for heating of said s liquid heat transfer medium by said externally heated fluid;
  whereby the heat transfer medium is heatable by either said at least one electric heating element and said input conduit, and the one or more pumps are operable to circulate the liquid heat transfer medium, once warmed by one or more heat inputs, through the dry tank is operable to store heat energy in the dry storage medium.

BRIEF DESCRIPTION OF THE DRAWINGS

Preferred embodiments of the invention will now be described in conjunction with the accompanying drawings in which:

FIG. 4 is another assembled perspective view of the finished thermal energy storage system of FIG. 3, from an opposing side thereof.

FIG. 5 is a schematic cross-sectional view of the finished thermal energy storage system of FIGS. 3 and 4, illustrating internal componentry of the wet tank thereof.

FIG. 6 is a schematic illustration of the multi-tank assembly of the preceding figures installed in an operating environment to form a functional thermal energy storage system serving an external heating application.

DETAILED DESCRIPTION

Figure 1:
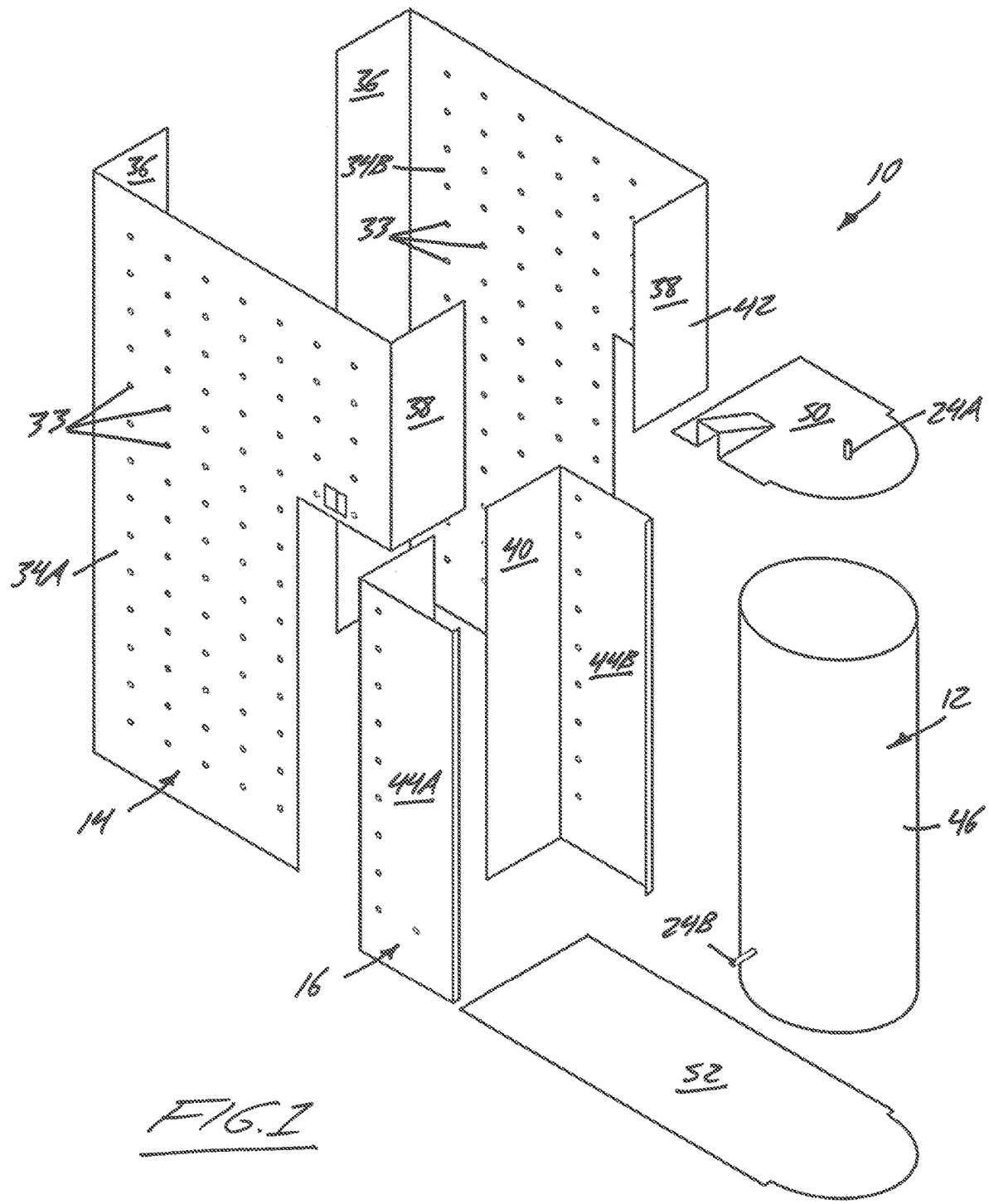
FIG. 1 is an exploded perspective view of a multi-tank assembly for a novel thermal energy storage system of the present invention, featuring a wet tank for holding a liquid heat exchange medium, a dry tank for holding a dry storage medium, and a phase-change material tank for holding a phase change medium.
Figure 2:
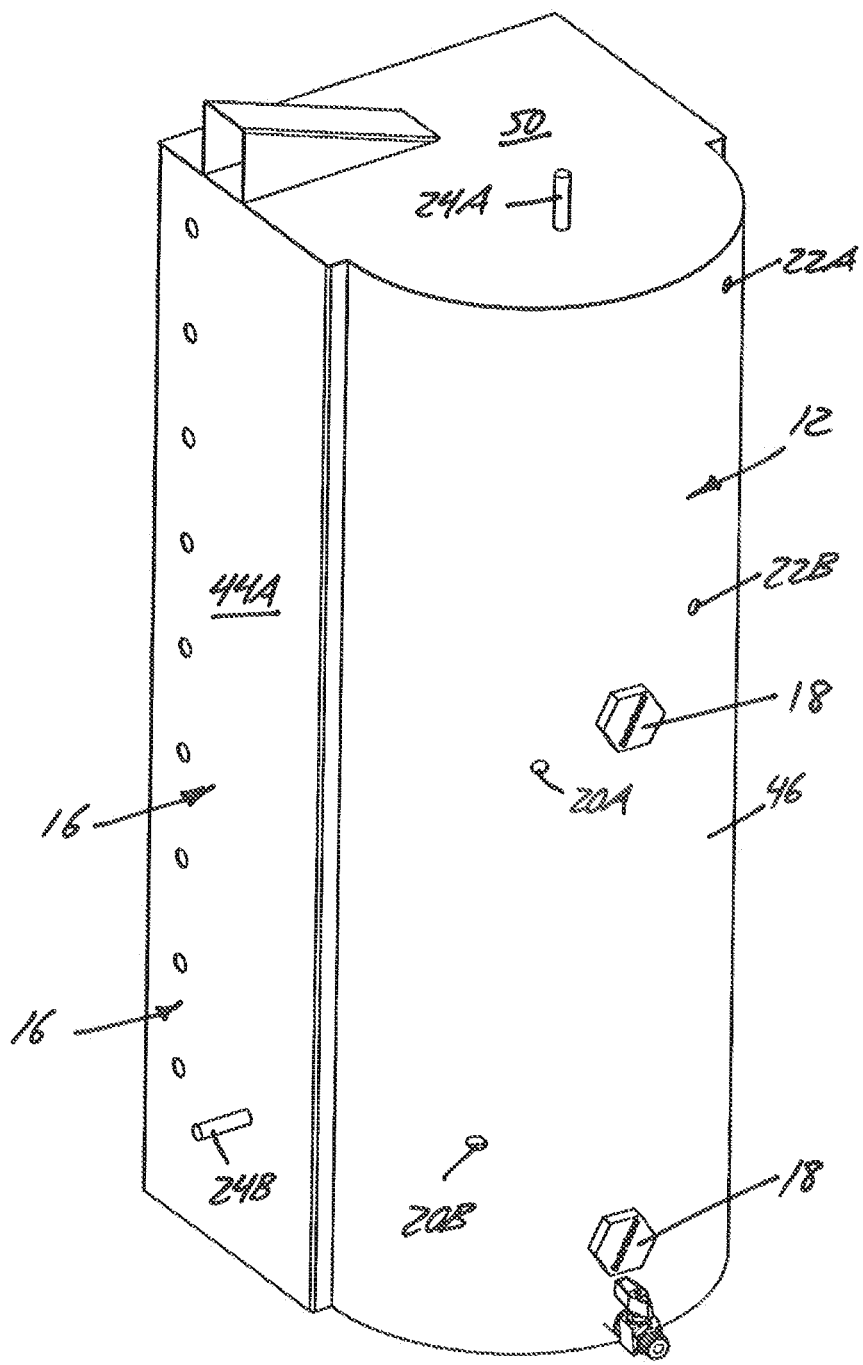
FIG. 2 is an assembled perspective view of a dual tank subassembly of the multi-tank assembly of FIG. 1, of which said subassembly is composed of the wet tank and phase-change material tank.
Figure 3:
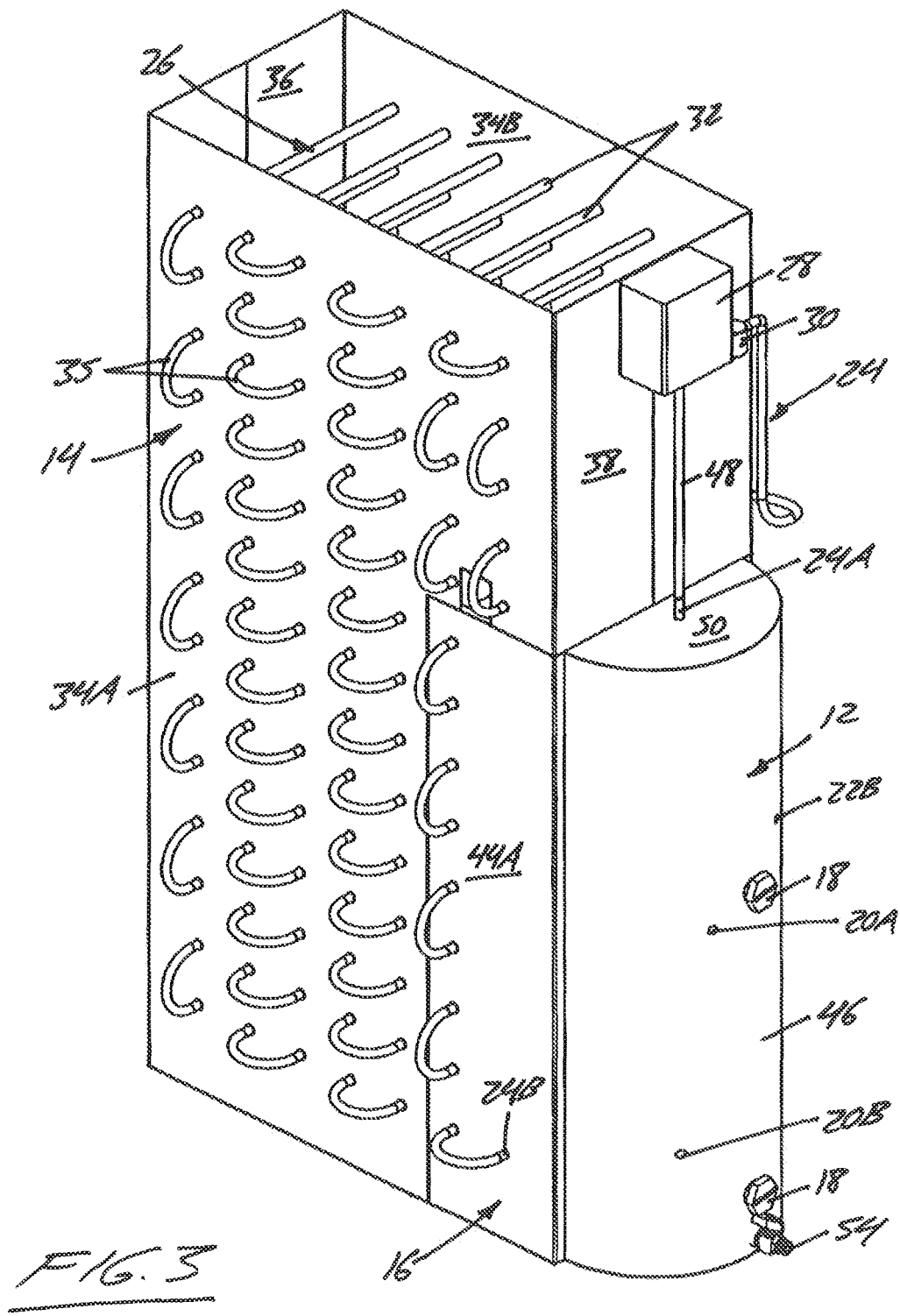
FIG. 3 is an assembled perspective view of a finished thermal energy storage system featuring the multi-tank assembly of FIG. 1, with a circuitous conduit routed amongst the three tanks to pump the liquid heat exchange medium from the wet tank circuitously through the other two tanks.

The drawings illustrate on preferred embodiment of a thermal energy storage system (TESS) of the present invention, embodied as a singular appliance 10 that comprises at least two tanks, specifically a wet tank 12 for respective holding therein of a liquid heat transfer medium, and a dry tank 14 for respective holding therein of a solid dry storage medium, and optionally also a third phase-change material tank 16 (PCM tank, for short) for respective holding therein of a phase change material (PCM). In operation of the appliance 10, the wet tank 12 serves as a buffer tank, and thus also may be referred to herein as such. The liquid heat transfer medium which with the wet tank 12 is filled during installation and setup of the appliance 10 may be water, though other liquids may be mixed therewith or substituted therefor, of which a non-limiting example of an addable or substitutable liquid heat transfer medium being propylene glycol. Wherever the term liquid heat transfer medium is used herein, the use of the singular "medium" rather than "media", unless stated explicitly otherwise, does not exclude embodiments in which the "medium" is a mixture or solution of multiple substances, but rather refers to the flowable liquid as a whole, regardless of the quantity of constituent substances of which it is composed.

As best revealed in the cross-sectional view of FIG. 5, the wet tank 12 has at least one electrical heating element 18 installed herein, of which there are two such heating elements 18 in the illustrated example, each installed at a different respective elevation on the wet tank 12. The wet tank 12 also includes a coiled input conduit 20 residing within the interior space of the wet tank, and a coiled output conduit 22 likewise residing within the interior space of the wet tank 12. At an exterior of the wet tank 12, coiled input conduit 20 has a respective inlet 20A and outlet 20B where external connections can be made for circulation of an externally heated working fluid through the coiled input conduit 20 for the purpose of warming the liquid heat transfer medium held within the wet tank 12. The coiled input conduit 20 is of solid-walled construction, whereby the externally heated working fluid circulated through the coiled input conduit 20 is kept fluidly isolated from the liquid heat transfer medium held in the wet tank, whereby there is a heat exchange relationship between the externally heated working fluid and the liquid heat transfer medium of the appliance, without any inter-mixing thereof. Likewise, the coiled output conduit 22 has a respective inlet 22A and outlet 22B at the exterior of the wet tank for where external connections can be made for circulation of a service fluid through the coiled output conduit 22 for the purpose of warming this service fluid using heating energy from the liquid heat transfer medium within the wet tank 12. Like the coiled input conduit 20, the coiled output conduit 22 is of solid-walled construction, whereby the service fluid circulated through the coiled output conduit 22 is kept fluidly isolated from the liquid heat transfer medium held in the wet tank, whereby there is a heat exchange relationship between the service fluid and the liquid heat transfer medium of the appliance, without any inter-mixing thereof. The liquid heat transfer medium is circulated purely internally of the appliance, the externally heated working fluid serves to introduce external heat energy to the appliance as a possible alternative or supplemental heat source to the electrical heating element (s) 18, and the service fluid serves to convey output heat energy from the appliance 10 to an external heating application (space heating, domestic hot water supply, etc.). In other embodiments, the electrical heating element(s) 18 may be substituted for other heating componentry, for example a gas burner installed beneath an internal bottom floor of the wet tank, as a non-limiting example of an alternative heating means of operable association to the wet tank, without necessarily residing inside the liquid-holding interior of the wet tank.

A circuitous heat exchange conduit 24 responsible for circulating the liquid heat transfer medium from the wet tank 12 through the dry tank 14, and the optional PCM tank 16 when included, includes an inlet 24A at one end of the circuitous heat exchange conduit 24 that is in fluid communication with the interior space of the wet tank for drawing of the liquid heat exchange medium therefrom, an outlet 24B at an opposing end of the circuitous heat exchange conduit 24 that is also in fluid communication with the interior space of the wet tank 12 for return of the liquid heat exchange medium thereto after circulation through the other tank(s), and between the inlet 24A and outlet 24B, a plurality of circuitous runs 26 passing circuitously through at least the dry tank 14, with at least some of these circuitous runs 26 passing also, or alternatively, through the PCM tank 16, if included. In the illustrated example, an expansion tank 28 is installed in-line of the circuitous heat exchange conduit 24 between the inlet 24A thereof and the circuitous runs 26, and a pump 30 responsible for pumping of the liquid heat transfer medium through the circuitous conduit is installed in-line thereof at a location between the expansion tank 28 and the circuitous runs 26. In the illustrated example, the circuitous runs 26 of the circuitous conduit 24 are composed of straight tubes 32 spanning horizontally across the dry tank 14 in penetrative relationship to arrayed holes 33 in two opposing side walls 34A, 34B thereof, and 180-degree elbow tubes 35 each connecting matching ends of two such straight pipes 32 outside one of those two opposing side walls 34A, 34B. This is just one non-limiting example of a manner in which the circuitous runs 26 may be assembled and arranged to pipe the liquid heat transfer medium circuitously through the dry tank 14, and the PCM tank 16, if included.

In the illustrated embodiment, the dry tank 14 is composed of flat walls, including the two aforementioned side walls 34A, 34B, which are of matching shape and size, and aligned relation to one another, each having an inverted L-shape by which the side wall 34A, 34B is horizontally wider at an upper segment thereof than a bottom segment thereof. At a full height rear edge of each side wall 34A, 34B, a full-height vertical rear wall 36 of the dry tank 14 perpendicularly interconnects the two vertical side walls 34A, 34B. At an upper-front edge of the wider upper segment of each side wall 34A, 34B, an vertical upper-front wall 38 of the dry tank 14 perpendicularly interconnects the two side walls 34A, 34B. In the illustrated embodiment that includes the PCM tank 16, a vertical lower-front wall 40 of the dry tank 14 that perpendicularly interconnects the two side walls 34A, 34B at lower-front edges of the two side walls 34A, 34B doubles as a rear wall of the PCM tank 16, which is nested beneath an upper-front overhang 42 of the dry tank 14 that results from the inverted L-shapes of the two side walls 34A, 34B thereof. The PCM tank 16 includes two vertical side walls 44A, 44B of rectangular shape of complimentary shape to the inverted L-shapes of the two side walls 34A, 43B of the dry tank 14, whereby each dry tank side wall 34A, 34B and its complimentary PCM tank side wall 44A, 44B collectively form a rectangular overall side wall of the appliance 10.

Like the side walls 34A, 34B of the dry tank 14, the side walls 44A, 44B of the PCM tank 16 are perforated with an arrayed set of holes 33 therein for mounted receipt of a subset of the straight tubes 32 of the circuitous conduit 24 installed in the PCM tank 16. In the illustrated example, the PCM tank 16, being of dramatically lesser size than the dry tank 14, features only a single row (one dimensional array) of holes 33 therein for receipt of the straight tubes 32 of minor fraction of the overall circuitous runs 26 of the circuitous conduit 24, while the much larger dry tank 14 features many rows of holes 33 for receipt of the straight tubes 32 of a much larger majority fraction of the overall circuitous runs 26 of the circuitous conduit 24. In the illustrated example, the single row of straight tubes 32 in the PCM tank 16 reside near the shared wall 40 that divides the PCM tank 16 from the dry tank 14, and are coupled to a neighbouring row of straight tubes 32 beside on the opposing side of this shared wall by a respective subset of the elbow tubes 35, as can be seen in FIG. 4. At the opposing side of the PCM tank 16 of the illustrated example, another subset of the elbow tubes 35 interconnect the PCM tank's straight tubes 32 to one another in vertically adjacent pairings thereof.

In the illustrated example, the wet tank 12 is a cylindrical tank having a cylindrical outer wall 46, a rear half of which is nested between the two side walls 44A, 44B of the PCM tank 16 and nested beneath the upper-front overhang 42 of the dry tank 14. A front half of the cylindrical wet tank 12 protrudes forwardly out from the front side of the PCM tank 16 and forwardly out from under the overhang 42 of the dry tank 14. In this example, an initial run 48 of the circuitous conduit 24 runs vertically from a top cover 50 of the cylindrical wet tank 12 up to the expansion tank 28, which in this scenario is mounted to the upper-front wall 38 of the dry tank in front of the overhang 42, where the pump 30 also resides. In the illustrated example, where the cylindrical wet tank 12 is partially nested between the side walls 44A, 44B of the PCM tank 16, the usable interior space of the PCM tank 16 for holding of the PCM therein is the space cooperatively bound by the rear wall of the PCM tank 16 (i.e. the shared lower-front wall of the dry tank 14), the PCM tank side walls 44A, 44B and the rear half of the wet tank's cylindrical outer wall 46. As can be seen in the exploded view of FIG. 1, the floors of three tanks 12, 14, 16 may be formed from a common base 52 of conforming shape to the footprints of the three tanks 12, 14, 16 of the appliance 10, and the cover 50 of the cylindrical wet tank 12 may be embodied in a shared tank cover that also caps off the top of the PCM tank 16, and thereby doubles as a bottom wall of the dry tank's front overhang 42. The electric heating elements 18 and conduit inlets and outlets 20A, 22A, 20B, 22B of the wet tank 12, and a valved drain spout 54 included thereon, are preferably situated at an exposed front half of the wet tank's cylindrical outer wall 46 for readily available access, which in the illustrated embodiment corresponds to similar front placement of the expansion tank 28 and pump 30 for convenient inspection and service access.

Having described the componentry and structure of the appliance 10, attention is now turned to the purpose and operation thereof. The appliance 10 is preferably prefabricated in a factory setting, and delivered to an intended site of use (e.g. residential home, or other building) with its tanks 12, 14, 16 in an empty state, thus reducing the shipping weight and cost. Once on site, the dry tank 14 is filled with a dry heat-storage medium, typically sand, though brick, clay, concrete or other heat-storage media may instead be used, whereupon the dry tank 14, typically the largest of the three tanks 12, 14, 16, now holds a significant thermal mass capable of storing a notable amount of thermal energy. Also on site, the wet tank 12 is likewise filled with the liquid heat transfer medium, which, during subsequent use of the appliance, will be circulated through the dry heat-storage medium held in the dry tank 14 via the circuitous conduit 24. The material characteristics and thermal properties of the dry heat-storage medium are such that it heats and cools at a slower rate than the liquid heat transfer media. In embodiments where the optional PCM tank 16 is included, it is filled, again preferably on-site, with a PCM, for example paraffin wax. The purpose of the PCM is to absorb thermal energy, like the heat-storage medium, but with the added benefit of a sudden and rapid release of energy as the PCT cools to its phase change (melting) temperature.

Of the two coiled conduits 20, 22, at minimum the inlet 22A and outlet 22B of the output conduit 22 are connected to supply and return lines of a service fluid loop through which the service fluid can deliver heat energy, absorbed from the liquid heat transfer medium in the wet tank 12, to a heating application. The heating application may a space heating application, where the service fluid is the water of a hydronic heating system serving the indoor space heating needs of a residential home or other building, or where the service fluid is fed to one side of a heat exchanger whose other side sees flow of the hydronic heating system's water therethrough. Alternatively, the heating application may be domestic hot water supply, where the service fluid is potable water warmed by the liquid heat transfer medium, or where the service fluid is fed to one side of a heater exchanger whose other side sees flow of the potable water supply therethrough for indirect heating of the potable water by the appliance through the heat exchanger.

Optionally, the inlet 20A and outlet 20B of the input conduit 20 are connected to supply and return lines of a working fluid loop through which an externally heated fluid can be circulated through the input conduit 20 to impart heat energy to the liquid heat transfer medium in the wet tank, for further transfer of such imparted heat energy to the dry heat-storage medium in the dry tank 14. For example, this working fluid loop may be embodied in the condenser side of a heat pump being used in an air conditioning capacity to cool an indoor space. In other examples, the working fluid loop may be one which the working fluid collects waste heat from a computer server room, waste heat from a compost heap, or heat from a solar water heater. In other examples, the input conduit 20 may be left unconnected, in which case the appliance is instead fully dependent on the one or more electrical heating elements 18 to warm the liquid heat transfer medium in the wet tank 12.

Regardless of whether the instantaneous use case of the appliance 10 is one in which thermal energy is inputted via the electrical heating element(s) 18, via externally heated working fluid from a heat pump, or via externally heated working fluid from another source, the liquid heat transfer medium in the wet tank 14 is heated to a temperature above ambient, but below boiling temperature of the liquid heat transfer medium, and thus below one hundred (100) degrees Celsius in the case of water being the liquid heat transfer medium), with operating temperatures of the liquid heat transfer medium typically in the range of fifty (50) to eighty (80) degrees Celsius. The liquid heat transfer medium from the wet tank 12 is pumped, either continuously or intermittently, through the circuitous conduit 24, and thus through the tubes 32 thereof that through the dry heat-storage medium in the dry tank 14, and through any of the tubes 32 that instead pass through the PCM tank 16 of the appliance 10, if present.

Thermal energy transfer occurs during such pumped conveyance of the liquid heat transfer medium through the appliance. In instances where the dry heat-storage medium in the dry tank 14 is cooler than the liquid heat transfer medium being circulated therethrough, then the dry heat-storage medium is heated by this warmer liquid heat transfer medium. Likewise, in the presence of a PCM tank 16 filled with PCM, heat transfer thereto from the liquid heat transfer medium will occur in instances where the PCM inside the PCM tank 16 is cooler than the liquid heat transfer medium being circulated therethrough. Such instances may be categorized as a heat storage mode of the appliance's operation. On the other hand, in instances where the dry heat-storage medium in the dry tank 14 is warmer than the liquid heat transfer medium being circulated therethrough, then the dry heat-storage medium heats the cooler liquid heat transfer medium. Likewise, in the presence of a PCM tank 16 filled with PCM, heat transfer therefrom to the liquid heat transfer medium will occur in instances where the PCM inside the PCM tank 16 is warmer than the liquid heat transfer medium being circulated therethrough. Such instances may be categorized as a heat dispensing mode of the appliance's operation, where the heat energy previously stored in the dry heat-storage medium (and in the PCM, if present) is transferred to the output coil 22 to use of such stored thermal energy by an external heating application.

It will be appreciated that while the illustrated embodiment employs one circuitous conduit 24 and one pump, that other embodiments may employ multiples thereof, and likewise there may be more than one coiled input conduit and one coiled output conduit, to enable heating of the liquid heat transfer medium by multiple external heat sources, and/or dispensing of heat from the liquid heat transfer medium to multiple heating applications. It will also be appreciated that the illustrated example of horizontal straight tubes laterally penetrating the dry and PCM tanks through side walls thereof, and elbow tubes externally interconnecting the straight tubes outside such side walls, are just one example of possible options for circuitous routing of the liquid heat transfer medium throughout a substantial volume of each such tank, at that other conduit layouts may alternatively be employed, just like the particular construction, shape and relative location of the different tanks may be rearranged, without detriment to the described functionality of the appliance. In some alternative embodiments, the tanks may alternatively be decoupled from another, rather than integrated together into a singular unitary appliance, without detraction from other inventive characteristics of the disclosed embodiment.

The invention possesses numerous benefits and advantages over previously known energy storage systems. In particular, the invention utilizes commonly available materials as the thermal mass which constitutes the energy storage media. Because media such as sand and concrete are so readily available, the invention can be shipped without the media in the tank, with the media added at time and location of installation, as described above. Moreover, the scale of the invention is designed to heat or cool the space of an average household and meet its hot water needs. This compact size and light shipping weight mean the invention can be manufactured at a central location, easily shipped to the installation location in common trucks or other shipping conveyances, and installed by a small crew of people in a day or less. It does not require on-site construction nor the use of cranes and large crews to place on site as larger, industrial thermal storage devices do nor does it require expensive electrochemical components that are required in electrical energy storage systems.

In addition to the foregoing attributes, the invention possesses numerous other advantages over conventional devices. By including an input coil in the wet tank that can be attached to a heat pump, the invention can be used not only as a means of residential space and water heating but also space cooling aka air conditioning, with undesired heat in the living space diverted to and stored in the TESS. Further, the input coil allows surplus heat from other sources to be transferred into the device such as heat from a computer server room, heat from the core of a large compost heap, or heat from a solar water heater.

Since various modifications can be made in the invention as herein above described, and many apparently widely different embodiments of same made, it is intended that all matter contained in the accompanying specification shall be interpreted as illustrative only and not in a limiting sense.

The invention claimed is:
1. A thermal energy storage system comprising:
   combined in a singular appliance:
   a wet tank for holding a liquid heat transfer medium therein;
   a dry tank for holding a dry heat-storage medium therein;
   one or more circuitous heat exchange conduits each having an inlet of fluidically communicative relationship with an interior of the wet tank, and an outlet of fluidically communicative relation to the wet tank at a point of discrete relation to said inlet, and at least a subset of the one or more circuitous heat exchange conduits passes circuitously through an interior of the dry tank in fluidly isolated relation to the dry heat-storage medium held therein;
   one or more pumps in operably installed relationship with said one or more circuitous conduits to circulate the liquid heat transfer medium therethrough in a manner sourced from the wet tank at the inlet of each circuitous conduit, conveyed onwardly and circuitously through the dry tank via said at least a subset of the circuitous one or more circuitous heat exchange conduits, and returned to the wet tank via the outlet of each circuitous conduit; and
   one or more heating components installed in operable relationship to the wet tank to enable warming of the liquid heat transfer medium held therein;

an output conduit installed the wet tank for routing of a service fluid through the interior of the tank in fluidly isolated relation to the liquid heat transfer medium held therein for heating of said service fluid by the liquid heat transfer medium;

whereby operation of the one or more pumps to circulate the liquid heat transfer medium, once warmed by one or more heat inputs, through the dry tank is operable to store heat energy in the dry heat-storage medium.

2. The system of claim 1 wherein said one or more heating components comprises at least one electric heating element.

3. The system of claim 1 wherein said one or more heating components comprises at least one input conduit installed the wet tank for routing of an externally heated fluid through the interior of the tank in fluidly isolated relation to the liquid heat transfer medium held therein for heating of said liquid heat transfer medium by said externally heated fluid.

4. The system of claim 2 wherein said one or more heating components further comprises at least one input conduit installed the wet tank for routing of an externally heated fluid through the interior of the tank in fluidly isolated relation to the liquid heat transfer medium held therein for heating of said liquid heat transfer medium by said externally heated fluid, whereby the heat transfer medium is heatable by either said at least one electric heating element and said input conduit.

5. The system of claim 3 wherein said at least one input conduit is a coiled input conduit of coiled shape inside the wet tank.

6. The system of claim 4 wherein said at least one input conduit is a coiled input conduit of coiled shape inside the wet tank.

7. The system of claim 1 wherein said at least one input conduit is a coiled input conduit of coiled shape inside the wet tank.

8. The system of claim 1 wherein the singular appliance further comprises a third tank for holding a phase change material therein, wherein at least one of the circuitous heat exchange conduits passes circuitously through an interior of the third tank in fluidly isolated relation to the phase change medium held therein.

9. The system of claim 8 wherein said one of the circuitous heat exchange conduits passes circuitously through the interiors of both the dry tank and the third tank.

10. A method of using the system of claim 3 comprising circulating the externally heated fluid through the through the at least one input conduit, thereby warming the liquid heat transfer medium, and pumping the liquid heat exchange medium through the at least a subset of the one or more circuitous heat exchange conduits, and thereby transferring heat energy from the heated fluid to the dry heat-storage medium for storage of said heat energy thereby.

11. The method of claim 10 wherein said heated fluid is circulated through the at least one input conduit from a heat pump.

12. The method of claim 11 comprising using said heat pump to cool an indoor space.

13. The system of claim 1 wherein said output conduit is fed by a potable water supply, and said service fluid is potable water warmed by the by the liquid heat transfer medium.

14. The system of claim 1 wherein said output conduit is connected to a primary side of a heat exchanger, a secondary side of which is connected to a potable water supply, and said service fluid is a heat exchange fluid for indirect of heating of potable water using heat energy from the liquid heat transfer medium.

15. The system of claim 1 wherein said output conduit is connected to a hydronic heating system of a building for space heating purposes.

16. A method of implementing the system of claim 1, comprising accepting or delivering, at or to a site of intended use, a prefabricated apparatus embodying at least the wet and dry tanks, and, on said site, filling the wet and dry tanks with the liquid heat exchange medium and dry heat-storage medium.

17. The method of claim 16 wherein said site is a residential household.

18. A thermal energy storage system comprising:
a wet tank for holding a liquid heat transfer medium therein;
a dry tank for holding a dry heat-storage medium therein;
one or more circuitous heat exchange conduits each having an inlet of fluidically communicative relationship with an interior of the wet tank, and an outlet of fluidically communicative relation to the wet tank at a point of discrete relation to said inlet, and at least a subset of the one or more circuitous heat exchange conduits passes circuitously through an interior of the dry tank in fluidly isolated relation to the dry heat-storage medium held therein;
one or more pumps in operably installed relationship with said one or more circuitous conduits to circulate the liquid heat transfer medium therethrough in a manner sourced from the wet tank at the inlet of each circuitous conduit, conveyed onwardly and circuitously through the dry tank via said at least a subset of the circuitous one or more circuitous heat exchange conduits, and returned to the wet tank via the outlet of each circuitous conduit; and
an output conduit installed the wet tank for routing of a service fluid through the interior of the tank in fluidly isolated relation to the liquid heat transfer medium held therein for heating of said service fluid by the liquid heat transfer medium;
one or more heating components installed in operable relationship to the wet tank to enable warming of the liquid heat transfer medium held therein; and
at least one input conduit installed the wet tank for routing of an externally heated fluid through the interior of the tank in fluidly isolated relation to the liquid heat transfer medium held therein for heating of said liquid heat transfer medium by said externally heated fluid;
whereby the heat transfer medium is heatable by either one of said one or more heating components and said input conduit, and the one or more pumps are operable to circulate the liquid heat transfer medium, once warmed by one or more heat inputs, through the dry tank is operable to store heat energy in the dry heat-storage medium.

19. The system of claim 18 wherein at least one of said input and output conduits are coiled conduits of coiled shape inside the wet tank.

20. The system of claim 18 wherein both of said input and output conduits are coiled conduits of coiled shape inside the wet tank.

\* \* \* \* \*